(12) United States Patent
Stott et al.

(10) Patent No.: US 7,584,738 B2
(45) Date of Patent: Sep. 8, 2009

(54) TORSIONALLY DAMPED ROTARY SHAFTS (75) Inventors: Michael Robert Stott, Market Deeping (GB); Brian Russell Knight, Shoreham-By-Sea (GB)

(73) Assignee: Ricardo UK Limited, West Sussex (GB)

( * ) Notice: Subject to any disclaimer, the term of this patent is extended or adjusted under 35 U.S.C. 154(b) by 446 days.

(21) Appl. No.: 10/529,126

(22) PCT Filed: Sep. 23, 2003

(86) PCT No.: PCT/GB03/04055

§ 371 (c)(1),
(2), (4) Date: Dec. 19, 2005

(87) PCT Pub. No.: WO2004/029476

PCT Pub. Date: Apr. 8, 2004

(65) Prior Publication Data

US 2006/0150944 A1    Jul. 13, 2006

(30) Foreign Application Priority Data

Sep. 27, 2002 (GB) .................................. 0222480.6

(51) Int. Cl.
*F16C 7/00* (2006.01)
(52) U.S. Cl. ............... 123/197.4; 123/197.3; 123/197.1
(58) Field of Classification Search ................. 417/221, 417/315–318; 92/13.3–13.7, 74, 138; 123/197.1–197.4, 123/55.2, 55.3, 193.1, 144, 78 B, 53.1, 39, 123/41.48, 241, 228, 78 R, 78 E, 78 F; *F16C 7/00*
See application file for complete search history.

(56) References Cited

U.S. PATENT DOCUMENTS 1,928,119 A    9/1933    Vargha 6,190,137 B1 *    2/2001    Robbins et al. ............. 417/221
7,117,827 B1 *    10/2006    Hinderks ................... 123/43 R (Continued)

FOREIGN PATENT DOCUMENTS

CH         684 395         9/1994

(Continued)

OTHER PUBLICATIONS

Patent Abstracts of Japan, Publication No. 57-177441, published Nov. 1, 1982, Mitsubishi Motors Corp. (Variable Balancer).

*Primary Examiner*—Stephen K Cronin
*Assistant Examiner*—Keith Coleman
(74) *Attorney, Agent, or Firm*—Cowan, Liebowitz & Latman (57) ABSTRACT

A rotary shaft, such as an automotive crankshaft, for rotation about an axis carries an eccentric substantially circular section, radially extending flap (6), connected to the radially outer surface of which is an annular housing (16) affording a cavity defined in part by radially inner and radially outer coaxial cylindrical surfaces. The axis (22) of the cavity is offset from the axis (4) of the shaft. The cavity accommodates an annular inertia mass (20) and the radially inner and outer surfaces of the cavity are opposed to radially inner and outer surfaces, respectively, of the inertia mass whereby there are two pairs of opposed surfaces. One of the said pairs constitutes bearing surfaces guiding relative motion of the inertia mass and the housing (16) about the axis (22) of the coaxial cylindrical surfaces. The other of the said pairs is spaced apart to define an annular space accommodating a displaceable material, such as a grease, the inertia mass and the cavity having a dimension in the radial direction which has a maximum value at a first position opposite to the direction of eccentricity and decreases progressively in both circumferential directions to a second position offset by 180° from the first position.

16 Claims, 7 Drawing Sheets

U.S. PATENT DOCUMENTS

| | | | |
|---|---|---|---|
| 7,249,936 B2 * | 7/2007 | Bae et al. .................... | 417/221 |
| 2002/0115813 A1 | 8/2002 | Shirasaka | |

FOREIGN PATENT DOCUMENTS

| DE | 78 15 703 | 9/1978 |
|---|---|---|
| DE | 39 25 181 | 2/1990 |
| DE | 199 49 206 | 4/2000 |
| EP | 0 540 818 | 5/1993 |
| FR | 534405 | 3/1922 |
| GB | 328004 | 4/1930 |
| GB | 331505 | 7/1930 |
| WO | WO 03/019038 | 3/2003 |

\* cited by examiner

TORSIONALLY DAMPED ROTARY SHAFTS

CROSS-REFERENCES TO RELATED APPLICATIONS

This application claims priority to International Application No. PCT/GB2003/004055 filed Sep. 23, 2003, which claims priority to British application No. 0222480.6 filed Sep. 27, 2002, the entire disclosure of which is hereby incorporated by reference.

The present invention relates to rotary shafts and is concerned with such shafts which include a torsional vibration damper.

Many rotary shafts are subjected to regular or intermittent torque fluctuations or shock loads. One example of such shafts is automotive crankshafts, which are subjected to a shock torque loading twice per revolution, in the case of a four cylinder engine, that is to say each time ignition of the fuel/air mixture in one of the cylinders occurs. Such shock loads can dramatically reduce the useful service of rotary shafts and can result in their sudden catastrophic failure, if the shaft should go into torsional resonance.

It is, therefore, common for automotive crankshafts to include a torsional damper. Two types of such damper are known, resilient dampers and viscous dampers.

Resilient dampers comprise a relatively massive weight attached to one end of the shaft by a resilient connection of e.g. rubber of elastomeric material. Movement of the weight relative to the shaft shears the resilient element and dissipates vibration energy by hysteresis of the rubber.

Viscous dampers comprise a housing connected to one end of the shaft to rotate with it. Inside the housing is a viscous fluid and a mass which is mounted on the shaft by way of a bearing so that it can rotate with respect to the shaft.

Under steady state conditions, the shaft, housing and mass rotate as a solid body. However, changes in speed of the shaft and thus the housing are resisted by shear forces created in the fluid in the narrow clearances between the mass and the interior of the housing.

Both of these known dampers are provided at the end of the shaft and thus increase the effective length of the shaft. However, in many applications this is highly undesirable, particularly in the engine space of motor vehicles in which there is an ever increasing pressure on space. Furthermore, the fluid used in viscous dampers is typically silicone-based and such liquids are subject to progressive thermal degradation at the temperatures to which e.g. crankshafts are typically subjected and this results in a progressive decrease over time in the effectiveness of the known dampers. Similar comments also applied historically to the resilient materials typically used in resilient dampers.

It is, therefore, the object of the present invention to provide a rotary shaft, particularly a shaft which forms part of an engine, such as a crankshaft, with a vibration damper which does not suffer from the disadvantages referred to above.

According to the present invention, a rotary shaft, such as an engine crankshaft, for rotation about an axis carries an eccentric, substantially circular section, radially extending flange, connected to the radially outer surface of which is an annular housing affording a cavity defined in part by radially inner and radially outer coaxial cylindrical surfaces, the axis of which is offset from the axis of the shaft, the cavity accommodating an annular inertia mass, the radially inner and radially outer surfaces of the cavity being opposed to radially inner and radially outer surfaces, respectively, of the inertia mass, whereby there are two pairs of opposed surfaces, one of the said pairs constituting bearing surfaces guiding relative rotation of the inertia mass and the housing about the axis of the coaxial cylindrical surfaces, the other of the said pairs being spaced apart to define an annular space accommodating a displaceable material, the inertia mass and the cavity having a dimension in the radial direction which has a maximum value at a first position opposite to the direction of eccentricity and decreases progressively in both circumferential directions to a second position offset by 180° from the first position.

Thus the shaft in accordance with the invention includes a torsional damper at any desired position between its ends and the damper need not be provided at one end of the shaft, thereby necessitating an increase in its length. This is of particular value when the shaft is an engine crankshaft. Furthermore, in a crankshaft the eccentric flange may be constituted by one of the crankwebs which is in any event traditionally provided on crankshafts.

The shaft carries an eccentric flange and the eccentricity of the flange results in its having a radial dimension which varies circumferentially. This radial dimension is at a maximum in one direction, the so-called direction of eccentricity, and decreases progressively in both circumferential directions to a second position offset from the first position by 180°. Connected to the outer surface of the eccentric flange is an annular housing which defines an annular cavity accommodating an annular inertia mass. The inertia mass has radially inner and radially outer cylindrical surfaces, the axis of which is offset from the axis of the shaft. The radially inner and outer surfaces of the cavity are opposed to radially inner and radially outer surfaces, respectively, of the inertia mass, whereby there are two pairs of exposed surfaces. One of these pairs of surfaces are relatively closely spaced and constitute bearing surfaces guiding relative rotation of the inertia mass and the housing about the axis of the cylindrical surfaces. The other of the pairs of surfaces is spaced apart, e.g. by between 1 mm and 2 mm, to define an annular space. This space accommodates a displaceable material and in the preferred embodiment this material is a viscous fluid, e.g. a grease. The inertia mass and the cavity have a dimension in the radial direction which has a maximum value at a first position opposite the direction of eccentricity and decreases progressively in both circumferential directions to a second position offset by 180° from the first position. The mass of the housing and the inertia mass and their weight distribution are set to counterbalance the eccentric flange and may additionally counterbalance a portion of the crankpin and connecting rod. The heavier portion of the housing and inertia mass thus replace the conventional counterweight on a crankshaft.

If the shaft should be subjected to a fluctuating or impact torque, it will accelerate or decelerate and the inertia of the inertia mass, which is movably accommodated in the cavity in the housing, will result in its acceleration lagging that of the shaft. The inertia mass will thus rotate within the cavity about the axis of the pairs of opposed surfaces and not about the axis of the crankshaft. This will result in the space between the pair of spaced surfaces increasing in width on one side and decreasing in width on the other. This will result in turn in the fluid being displaced or pumped from the area of reduced width to the area of increased width. Due to the viscosity of the liquid, this displacement will incur substantial pumping losses. These pumping losses will serve to oppose the acceleration or deceleration of the shaft and thus to damp any torsional vibrational movements. Shear forces will also be created in the viscous liquid but the part played by these forces in damping vibration of the shaft is small compared to that of the pumping losses and this means that the liquid selected may have a very much lower viscosity than that of the silicone fluids traditionally used in viscous dampers. This permits the selection of a fluid, such as a grease, which has a very much higher long-term stability to increased temperature than the silicone fluids which are conventionally used. It is preferred that the viscous fluid has a viscosity in the range of 5.000 to 25,000, more preferably 10,000 to 15,000, centistokes, which is very much lower than the value of 100,000 to 300,000 centistokes, which is the typical viscosity range of the silicone fluids traditionally used in viscous dampers.

In a modified embodiment, the displaceable material comprises a resilient solid material of e.g. rubber or elastomeric material. In this case, the material cannot be displaced from positions where the space is of minimum width to positions where it is of maximum width but it can be displaced a certain distance in the circumferential direction and is subjected to alternating compression and relaxation at positions which will move circumferentially back and forth. The hysteresis losses suffered by the resilient annular member will therefore be substantially in excess of those in the resilient member in a conventional resilient vibration damper and the damping effect will be thereby enhanced.

In order to be able to introduce the inertia mass and the displaceable material into the cavity, it is preferred that the housing includes a cover plate which closes the cavity and extends in a radial plane.

The inertia mass may potentially become jammed in one or other of its extreme positions after it has rotated in the housing and this may be prevented by the provision of two end stops. The inertia mass may then return readily to its rest or central position under the action of the forces to which it is subjected but it may be desirable to provide spring means acting on the inertia mass and biasing it towards a position in which the radial width of the space is constant. The spring means may take the form of one or more springs of conventional type, e.g. coil springs, extending between the housing and the inertia mass and it may also take the form of an annular member of elastomeric material connected between the two cylindrical surfaces defining the space. In this event, the elastomeric material need not occupy the whole of the space and the remainder may be occupied by a viscous liquid.

As mentioned above, the imbalance caused by the eccentricity of the flange is counterbalanced by the asymmetrical construction of the housing and inertia mass. In order to minimise the radial dimension of the shaft and damper, it may be desirable for the thickness in the axial direction of the portion of the housing opposite to the direction of eccentricity to be greater than that of the eccentric flange.

According to a further aspect of the present invention, an automotive crankshaft for rotation about an axis carries at least one pair of axially spaced, radially extending eccentric crankwebs, at least one of which has a circular cylindrical radially outer surface, the axis of which is offset from the axis of the crankshaft, and connected to which is the inner surface of an annular member of resilient material, connected to the outer surface of which is the cylindrical inner surface of an annular inertia mass, the weight distribution of which counterbalances the eccentricity of the associated crankweb. Thus this embodiment is similar to that referred to above, but since a solid resilient material is used, the housing has been omitted and the integrity of the damper is ensured by connecting the annular member of resilient material to both the eccentric flange and the inertia mass. The inertia mass is again heavier on the side opposite to the direction of eccentricity but since it is not accommodated in a space within a housing, its size need not decrease progressively but may decrease abruptly. Its weight distribution is simply selected such that it counterbalances the associated crankweb, whereby the crankshaft is dynamically balanced.

The inner surface of the resilient material may be connected directly to the external surface of the crankweb or indirectly via a metallic sleeve secured, e.g. by press-fitting or force-fitting, to the crankweb.

Further features and details of the invention will be apparent from the following description of certain specific embodiments, all of which relate to automotive crankshafts, which is given with reference to the accompanying drawings, in which.

Figure 1:
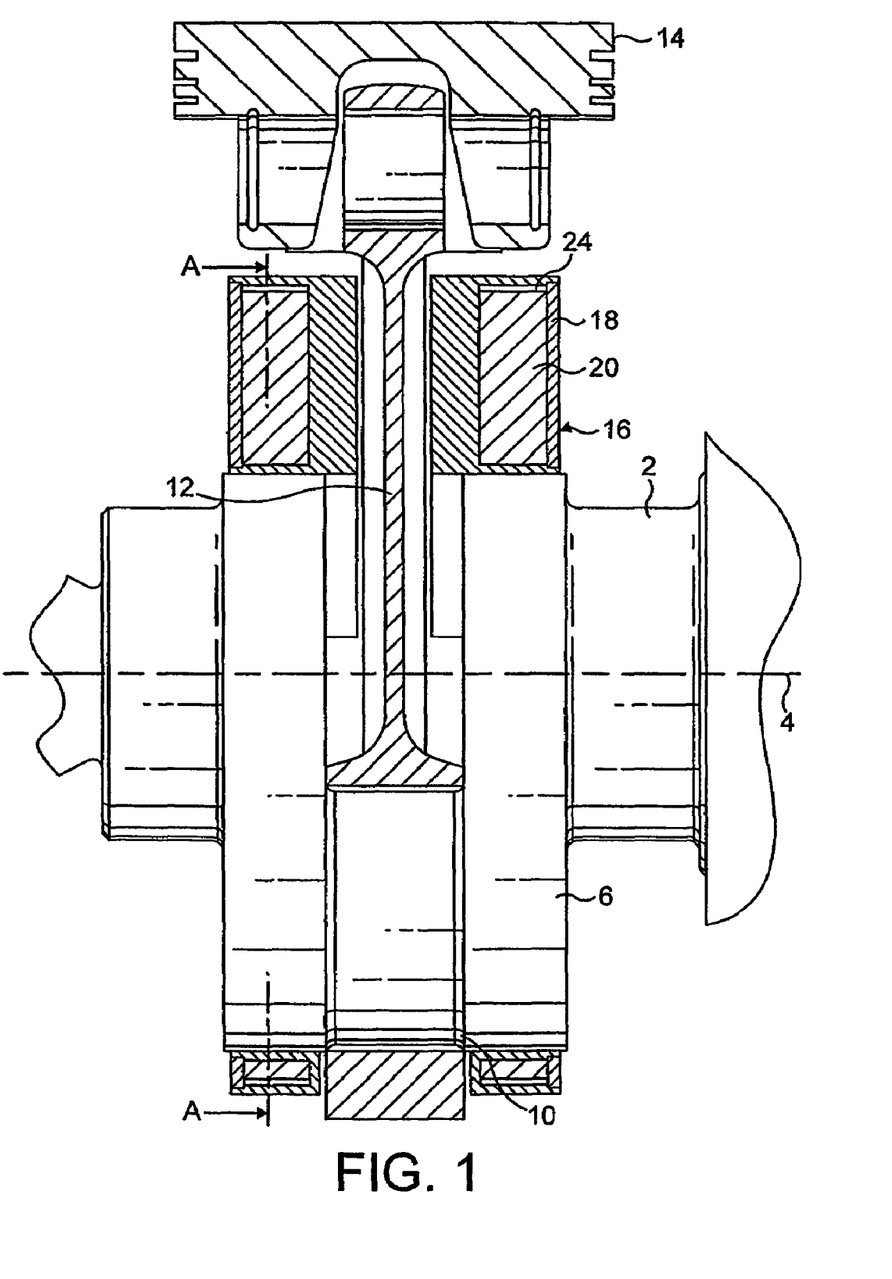
FIG. 1 is a scrap side view, partly in section, of a first embodiment of crankshaft in accordance with the invention.

FIG. 1 shows a crankshaft 2, which is mounted to rotate about an axis 4 and carries a number of pairs of spaced crankwebs 6, in the usual manner. The number of pairs of crankwebs 6 will be equal to the number of pistons to which the crankshaft is connected but in this case only one such pair is shown. Each crankweb 6 has a circular peripheral surface and is eccentrically positioned on the crankshaft such that the centre of the circle is at a point 8, which is offset from the axis 4 by a predetermined distance in the direction of eccentricity. Extending between the eccentric portions of the pair of crankwebs is a crankpin 10 which is pivotally connected in the conventional manner to one end of a connecting rod 12, the other end of which is pivotally connected in the conventional manner to a piston 14.

Connected to the external surface of each crankweb 6 is an annular housing 16 defining a rectangular section internal cavity which is accessible by way of a lateral cover 18. Accommodated within the cavity is an inertia mass 20 of steel or the like. The housing 16, the cavity within it and the inertia mass 20 are all of annular shape with a radial dimension that is a maximum at a first position on the side opposite to the direction of eccentricity of the crankwebs and reduces progressively in both directions to a second position that is offset from the first position by 180°. The housing 16 and the inertia mass 20 are of relatively massive construction and are thus substantially heavier on the side opposite to the direction of eccentricity. They are dimensioned such that the heavier portions of the housing and inertia mass counterbalance the eccentricity of the crankwebs so that the crankshaft is dynamically and statically balanced. It will be seen that, for this purpose, it may be necessary, as in the present case, for the housing 16 to be wider, that is to say have a greater dimension in the axial direction, than the associated crankweb.

Figure 2:
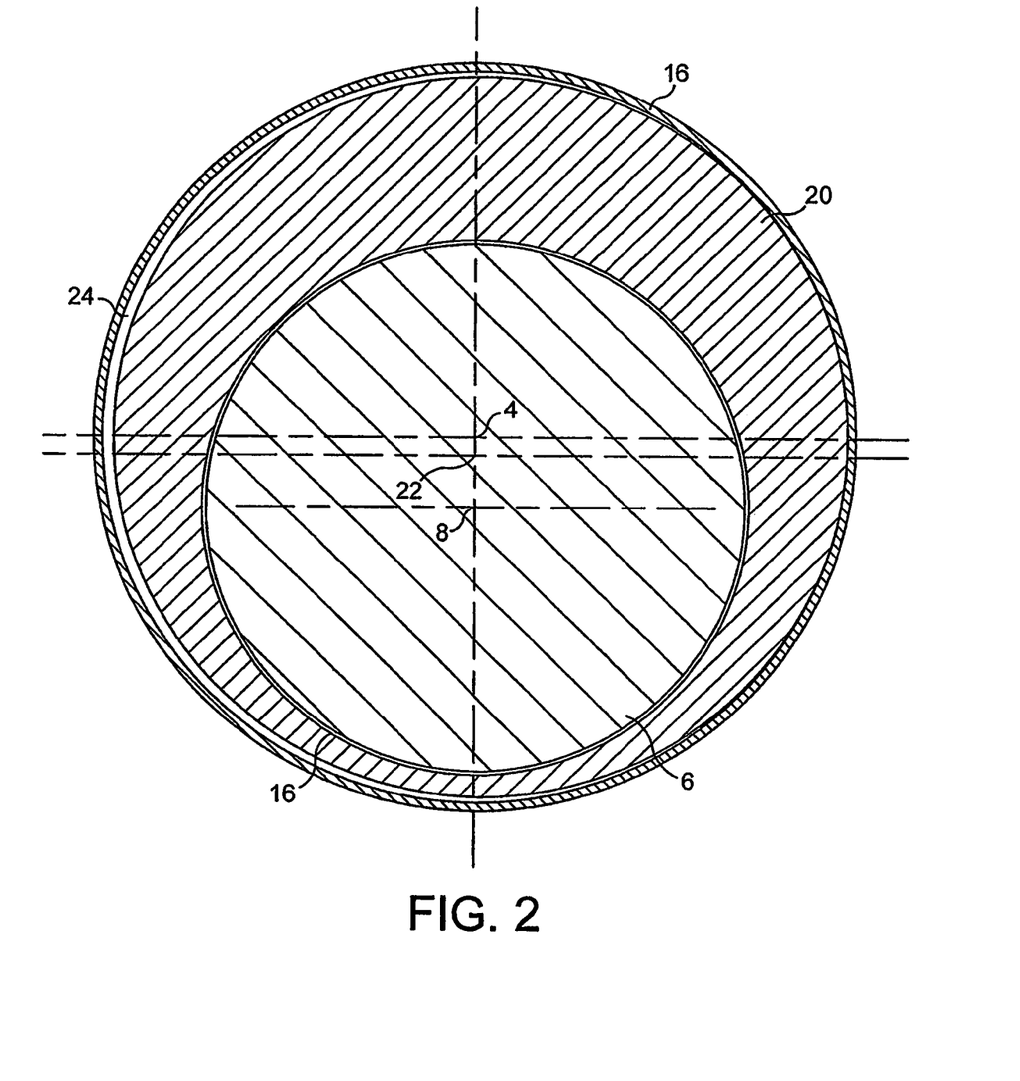
FIGS. 2 and 3 are transverse sectional views of the crankshaft on the line A-A in FIG. 1 showing the inertia mass in the two extreme positions, respectively.

The radially inner surface of the annular cavity is of circular section and is opposed to the internal surface of the inertia mass 20, which is also of substantially circular section. These two surfaces are of substantially the same diameter and have a clearance between them, typically of only about 0.025 mm when the inertia mass has an external diameter of about 100 to 150 mm, and thus act as bearing surfaces. The radially outer surface of the cavity is also of circular section and is opposed to the coaxial radially outer surface of the inertia mass. Both of these surfaces are of circular section, whose centres are at a point 22 slightly offset from the axis 4 of the crankshaft and whose diameters differ by a small amount of typically 1 to 2 mm. An annular space 24 is thus defined between these two surfaces which is occupied by a viscous fluid. This may be copper grease, that is to say a grease containing metallic copper particles, and is preferably a dimethyl silicone grease as supplied by Nye Lubricants, Inc.

In use, when the shaft rotates at a constant speed, the housing and the inertia mass within it rotate with, and at the same speed as, the shaft. If, however, the shaft should be subjected to a shock torque tending to increase its speed, the inertia of the inertia mass will mean that the mass will not accelerate at the same rate as the shaft. The inertia mass will therefore start to rotate within the housing, with relative movement occurring at the opposed bearing surfaces. However, as a result of the progressively changing width of the inertia mass, the space 24 filled with the copper grease will not remain of constant width, as previously, and instead its width will increase on one side and decrease on the other side, as shown in FIG. 2. If, on the other hand, the shaft should suddenly decelerate, the reverse effect will occur and the width of the space 24 will decrease on the said one side and increase on the said other side. This variation in width distribution of the space 24 will result in the copper grease being displaced from areas of reducing width to areas of increasing width of the space. Movement of the inertia mass relative to the housing will therefore be resisted by shear forces engendered in the grease and also, and more importantly, by the pumping losses incurred by the necessity of pumping the grease from one location to another. These forces and losses will tend to resist relative rotation of the inertia mass and the housing and thus damp changes in speed or rotary vibration of the crankshaft.

In a modified embodiment, which is not illustrated, the outer surfaces of the inertia mass 20 and of the cavity in the housing 16 are closely spaced and act as the bearing surfaces and the space 24 occupied by grease is defined between the inner surfaces of the inertia mass and the cavity. This embodiment operates in precisely the same manner as the first embodiment.

Figure 3:
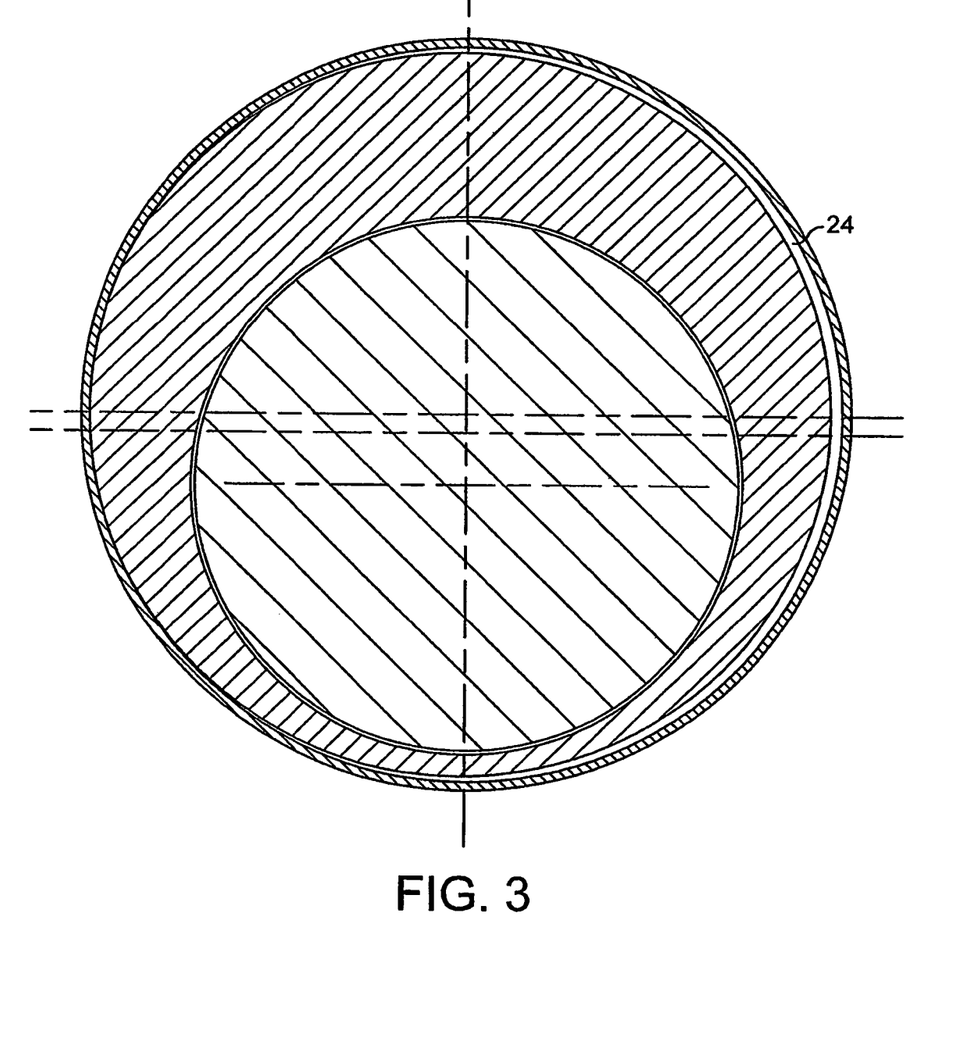

The inertia mass will typically rotate between 0.5° and 2° but under intense acceleration may rotate between about 3° and 5° relative to the housing until the inertia mass contacts a stop member on the housing or until the opposed surfaces defining the space 24 come into contact, as illustrated in FIGS. 2 and 3. Further rotary movement in the same direction is then impossible.

Subsequent vibration or acceleration of the crankshaft in the opposite sense will normally result in the contacting surfaces moving out of contact and the inertia mass rotating relative to the housing back to or through the neutral position in which the space 24 is of constant width. However, depending on the dimensions and the grease used, it is possible that "stiction" will retain the two surfaces "adhered" together and it may therefore be desirable to provide the inertia mass with one or more return springs. Such a modified embodiment is shown in FIGS. 4 and 5.

Figure 4:
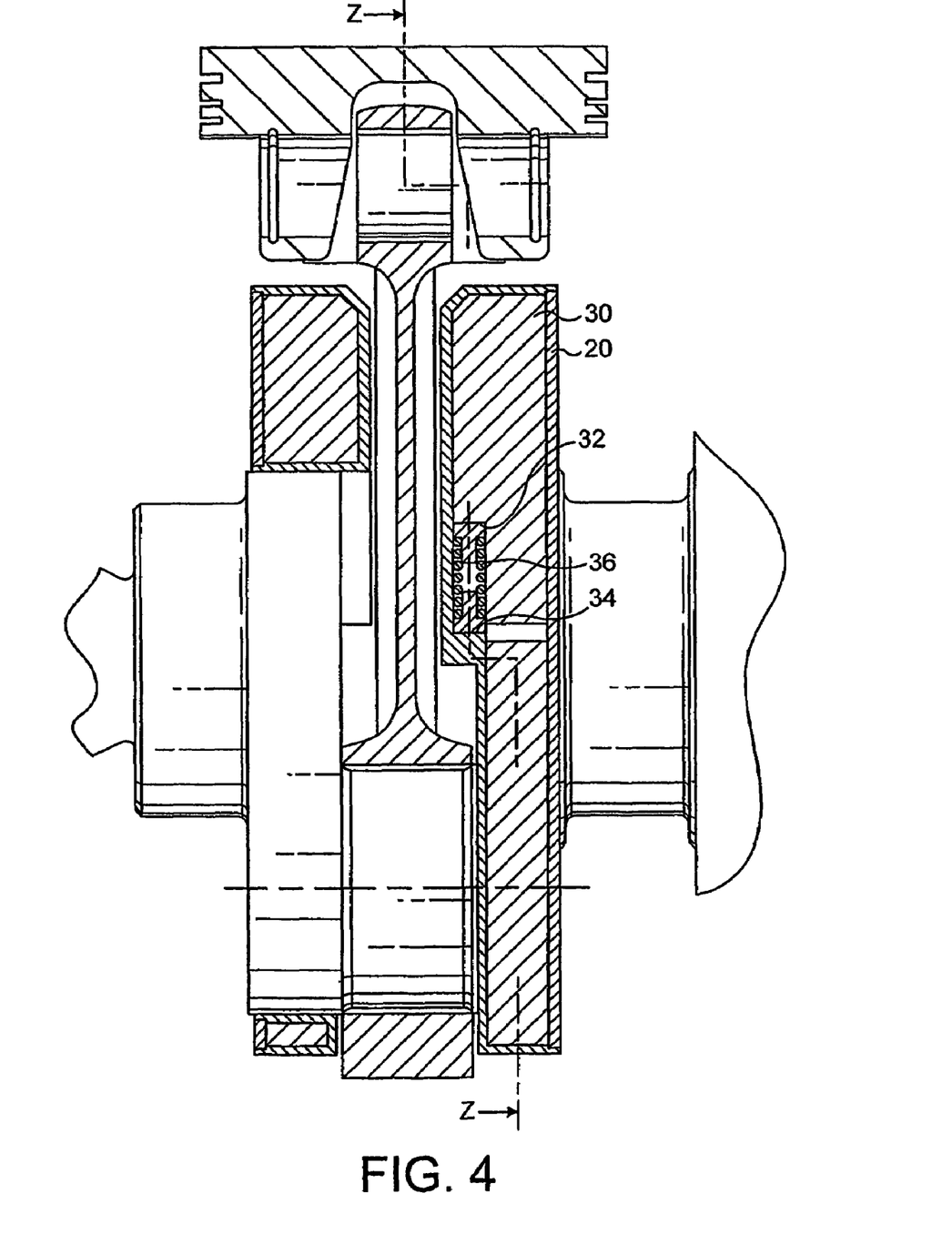
FIG. 4 is a view generally similar to FIG. 1 of a second embodiment.
Figure 5:
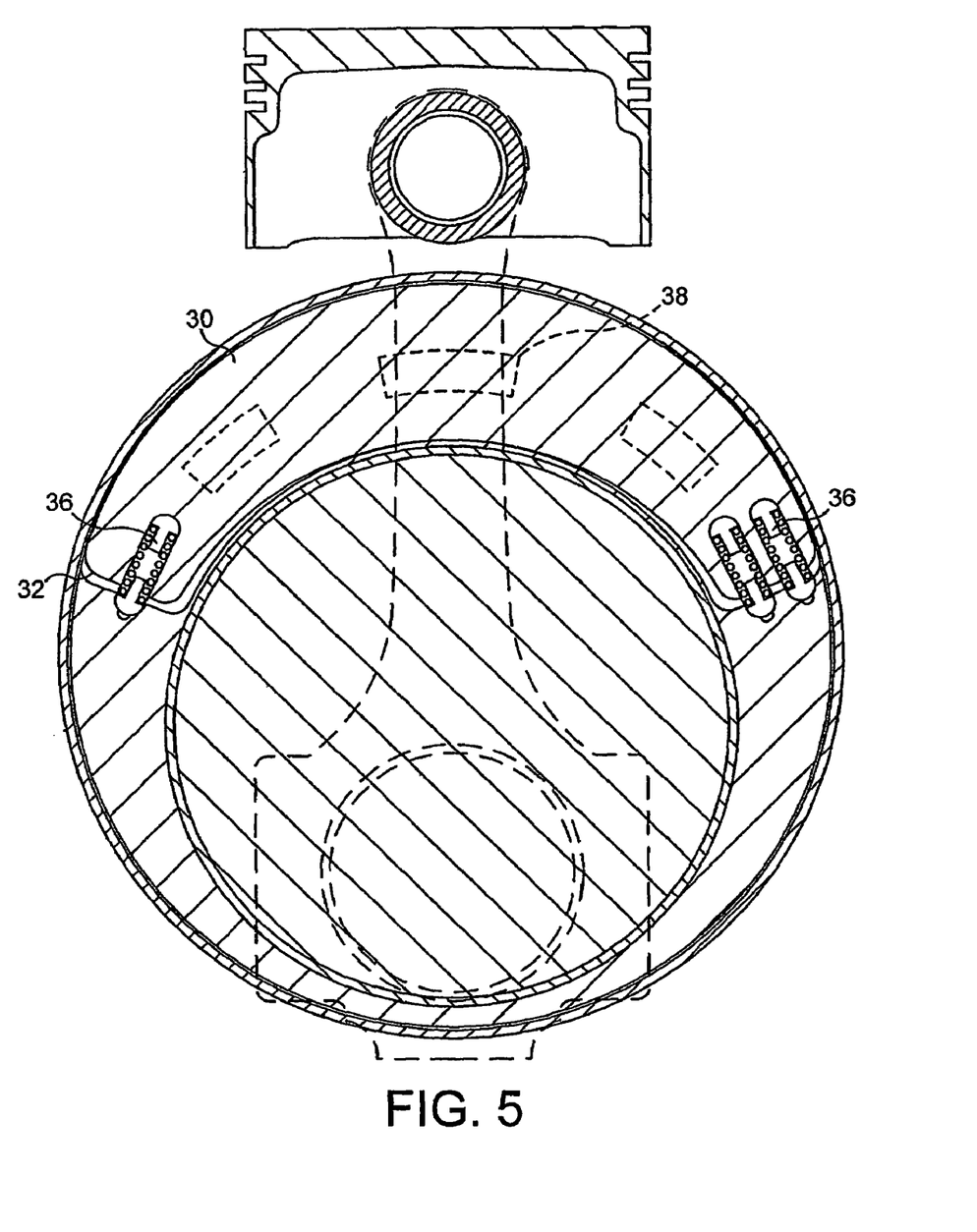
FIG. 5 is a transverse sectional view generally similar to FIGS. 2 and 3 but on the line Z-Z in FIG. 4.

In the embodiment of FIGS. 4 and 5, a portion 30 of inertia mass 20 opposite to the direction of eccentricity is of increased thickness in the axial direction and at its end the portion 30 affords oppositely circumferentially directed shoulders 32. These shoulders 32 are opposed to similar shoulders 34 on the crankwebs. Secured to or adjacent, and extending between, the opposed pairs of shoulders 32, 34 is a return spring 36, as shown on the left in FIG. 5, or two return springs 36, as shown on the right of FIG. 5.

In the previous embodiments, the axial end surfaces of the inertia mass 20 are smooth and closely spaced from the opposed surfaces of the cavity. However, in the embodiment of FIGS. 4 and 5, one or both of these surfaces are provided with a number of thrust pads 38 which are closely spaced from the opposed surface of the cavity.

Figure 6:
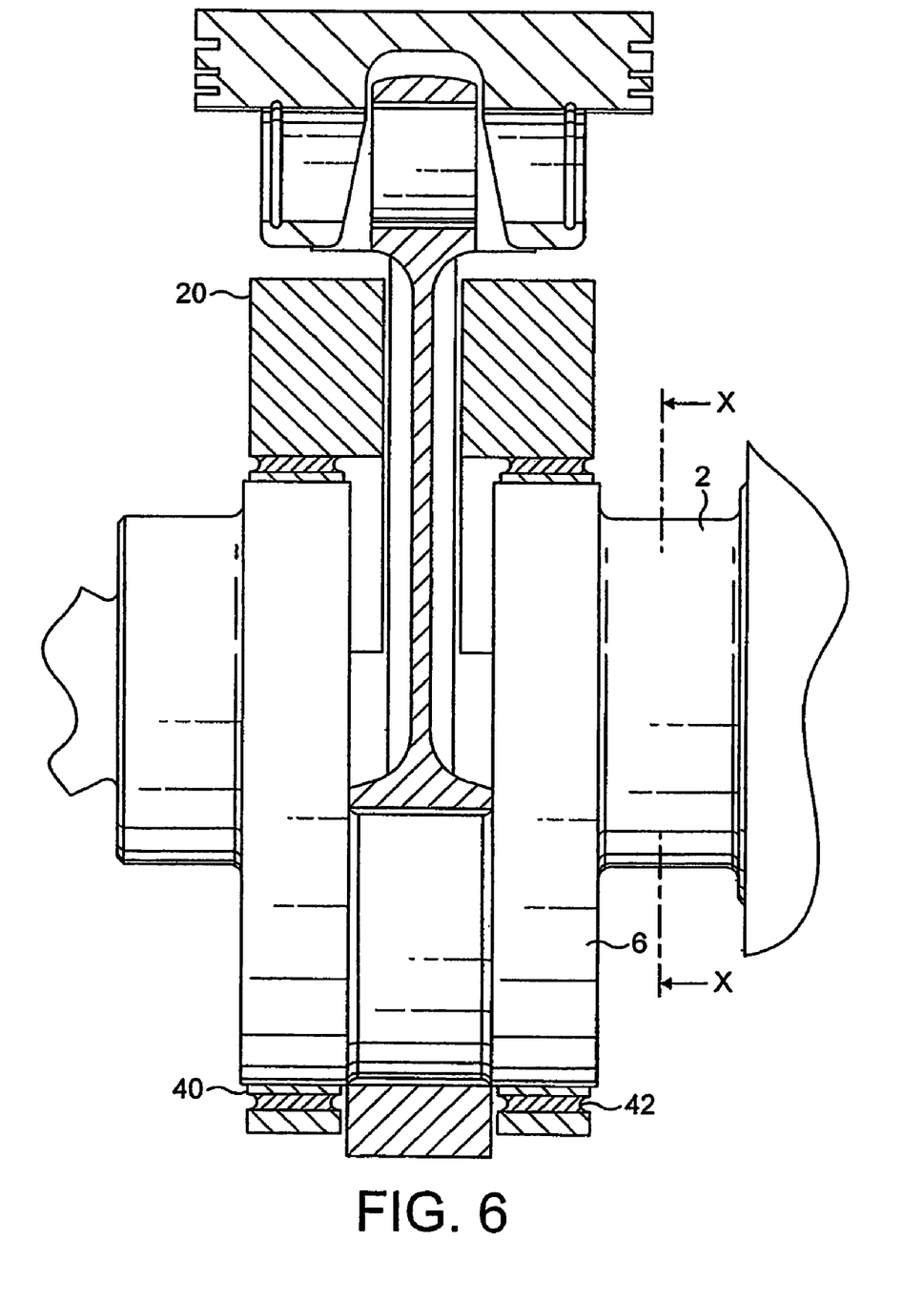
FIG. 6 is a further view generally similar to FIG. 1 of a third embodiment.
Figure 7:
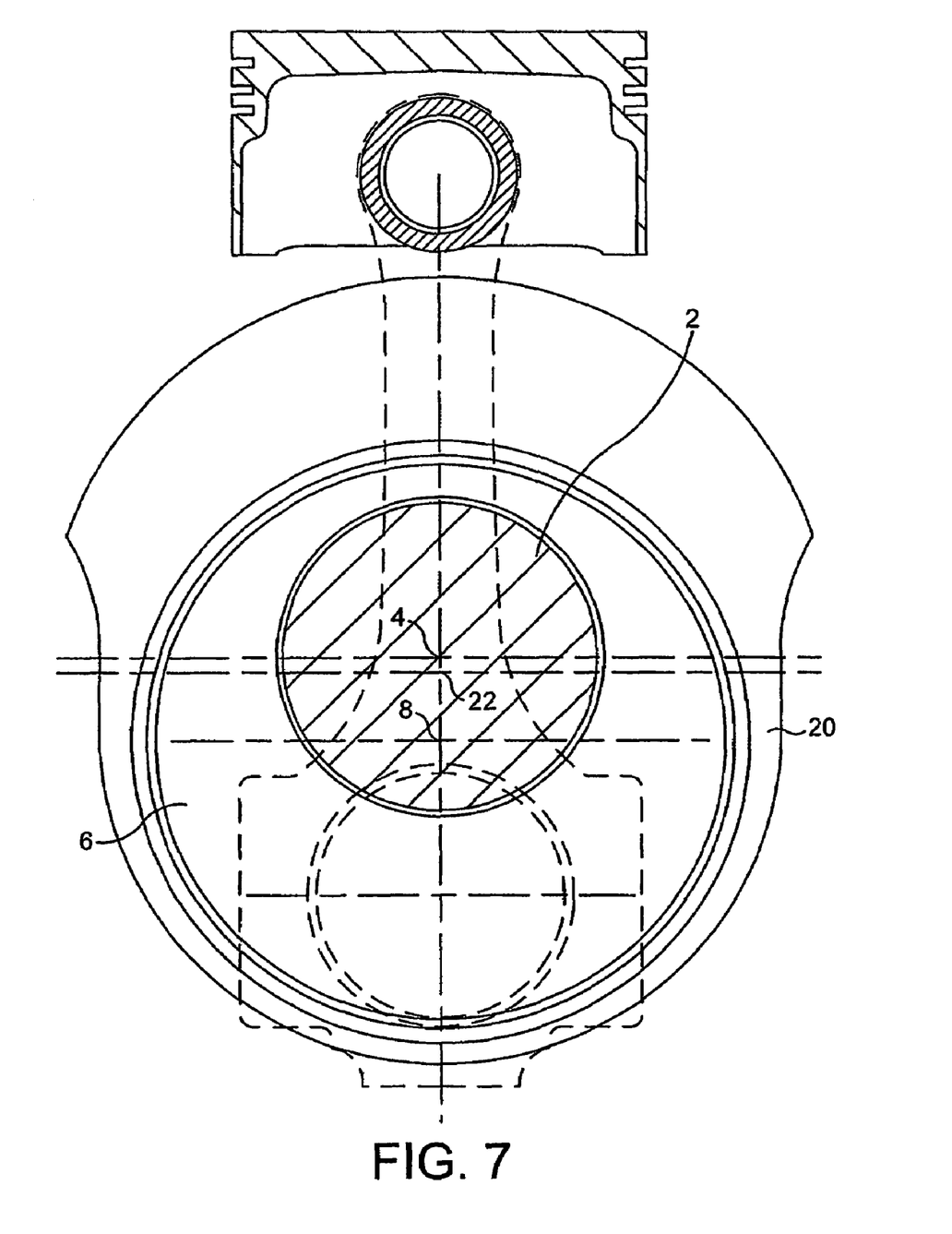
FIG. 7 is a sectional view on the line X-X in FIG. 6 generally similar to FIGS. 2 and 3 of the third embodiment.

In all the embodiments described above, the space 24 is occupied by a displaceable material in the form of a viscous liquid and the damping effect is achieved by virtue of shear forces and pumping losses. All of these embodiments may be modified by replacing the viscous liquid by a body of resilient material e.g. rubber or an elastomer. In this case, no pumping occurs but the resilient material is repeatedly compressed and decompressed as a result of the variation in the thickness distribution of the space 24 and damping is achieved by virtue of the resilience of the material and hysteresis losses. The use of resilient material permits the construction to be modified and simplified and such a construction is illustrated in FIGS. 6 and 7.

Secured to the radially outer surface of the circular section eccentric crankwebs 6 by push-fitting or force-fitting is an annular sleeve 40. Secured to the outer surface of the sleeve 40 is the internal surface of a resilient ring 42 of resilient rubber or elastomeric material. The resilient material is resistant to temperatures of up to 250° C. or more, e.g. as supplied by Metaldyne International. The material may be as disclosed in EP-A-0540818 or US 20020115813. Secured to the outer surface of the elastomeric ring is the internal circular section surface of an inertia mass 20. The inertia mass 20 has a width in the radial direction which is relatively large over about one third of its circumference opposite to the direction of eccentricity and relatively small elsewhere. The inertia mass thus has a heavier portion 21 which acts as a counterweight to the eccentric crankweb 6.

This vibration damper operates in a manner not dissimilar to the conventional resilient vibration damper but has two major differences. Firstly, it is situated, in use, within the crankcase and thus does not add to the overall length of the crankshaft, as is usual. Secondly, if rotary vibration should occur, the inertia mass 20 will rotate a small distance about the crankweb 6. Since this rotation is about the axis 8, which is offset from the axis 4 of the crankshaft, the width of the space accommodating the elastomeric ring 42 will vary locally, so the elastomeric material will be locally compressed and expanded. This will result in increased hysteresis losses and thus in an enhanced damping effect.

The invention claimed is:

1. A rotary shaft for rotation about an axis and carrying a substantial circular radially extending flange having a circumferential outer surface, said circular flange having an axis which is parallel to and offset from said axis of said rotary shaft, a housing connected to said outer surface of said flange, said housing defining a cavity, said cavity having radially inner and radially outer cylindrical surfaces, said radially inner and outer cylindrical surfaces having axes which are offset from one another and which are both parallel to said axis of said rotary shaft, an inertia mass within said cavity, said mass having radially inner and radially outer cylindrical surfaces, said radially inner and outer cylindrical surfaces having axes which are offset from one another and which are both parallel to said axis of said rotary shaft, said radially inner cylindrical surfaces of said inertia mass and of said cavity forming a first facing pair of surfaces, said radially outer cylindrical surfaces of said inertia mass and of said cavity forming a second facing pair of surfaces, one of said facing pairs of surfaces constituting bearing surfaces guiding motion of said inertia mass, the other of said facing pairs of surfaces being spaced apart to define a space accommodating a displaceable material, said inertia mass and said cavity having dimensions in the radial direction which has a maximum value at a first position opposite to the direction of eccentricity and which decreases progressively in both circumferential directions to a second position offset by 180° degrees from the first position, and said inertia mass and said cavity having relative dimensions to allow said inertia mass limited movement in rotation with respect to said cavity.

2. A shaft as claimed in claim 1 in which the displaceable material is a viscous liquid.

3. A shaft as claimed in claim 2 in which the viscous liquid comprises a grease.

4. A shaft as claimed in claim 1 in which the housing is closed by a cover plate extending in a radial plane.

5. A shaft as claimed in claim 1 further comprising: spring means acting on the inertia mass and biasing it towards a position in which the radial width of the space is constant.

6. A shaft as claimed in claim 2 further comprising: spring means acting on the inertia mass and biasing it towards a position in which the radial width of the space is constant.

7. A shaft as claimed in claim 3 further comprising: spring means acting on the inertia mass and biasing it towards a position in which the radial width of the space is constant.

8. A shaft as claimed in claim 4 further comprising: spring means acting on the inertia mass and biasing it towards a position in which the radial width of the space is constant.

9. A shaft as claimed in claim 1 wherein: the thickness in the axial direction of the portion of the housing opposite to the direction of eccentricity is greater than that of the eccentric flange.

10. A shaft as claimed in claim 2 wherein: the thickness in the axial direction of the portion of the housing opposite to the direction of eccentricity is greater than that of the eccentric flange.

11. A shaft as claimed in claim 3 wherein: the thickness in the axial direction of the portion of the housing opposite to the direction of eccentricity is greater than that of the eccentric flange.

12. A shaft as claimed in claim 4 wherein: the thickness in the axial direction of the portion of the housing opposite to the direction of eccentricity is greater than that of the eccentric flange.

13. A shaft as claimed in claim 5 wherein: the thickness in the axial direction of the portion of the housing opposite to the direction of eccentricity is greater than that of the eccentric flange.

14. A shaft as claimed in claim 6 wherein: the thickness in the axial direction of the portion of the housing opposite to the direction of eccentricity is greater than that of the eccentric flange.

15. A shaft as claimed in claim 7 wherein: the thickness in the axial direction of the portion of the housing opposite to the direction of eccentricity is greater than that of the eccentric flange.

16. A shaft as claimed in claim 8 wherein: the thickness in the axial direction of the portion of the housing opposite to the direction of eccentricity is greater than that of the eccentric flange.

* * * * *